L. F. LITTLE.
BEATER BLADE FOR FLOUR BOLTING AND DRESSING MACHINES.
APPLICATION FILED MAR. 1, 1915.
1,150,213. Patented Aug. 17, 1915.
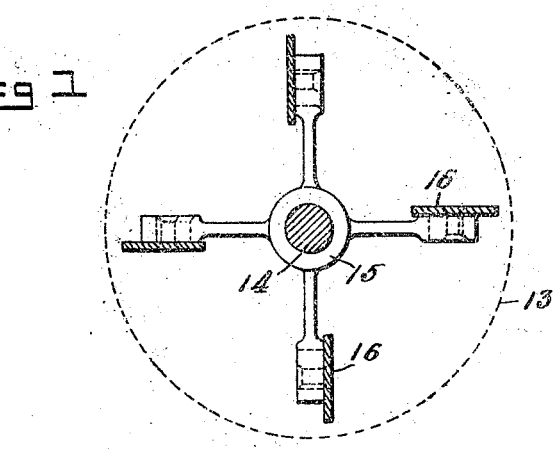
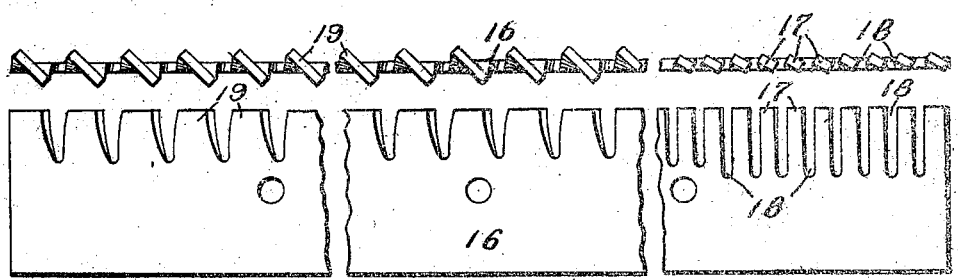
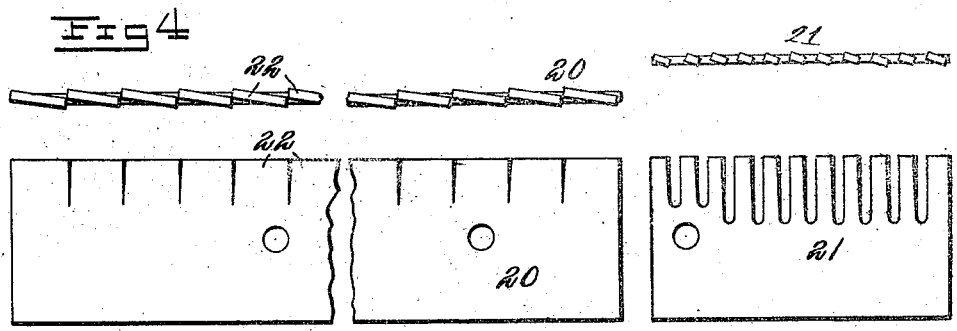
Inventor
Lucius Freeman Little

UNITED STATES PATENT OFFICE.

LUCIUS FREEMAN LITTLE, OF OWENSBORO, KENTUCKY, ASSIGNOR TO THE ANGLO-AMERICAN MILL CO., OF OWENSBORO, KENTUCKY, A CORPORATION OF KENTUCKY.

BEATER-BLADE FOR FLOUR BOLTING AND DRESSING MACHINES.

1,150,213.      Specification of Letters Patent.      Patented Aug. 17, 1915.

Application filed March 1, 1915. Serial No. 11,270.

*To all whom it may concern:*

Be it known that I, LUCIUS FREEMAN LITTLE, a citizen of the United States, residing at Owensboro, in the county of Daviess and State of Kentucky, have invented new and useful Improvements in Beater-Blades for Flour Bolting and Dressing Machines, of which the following is a specification.

The present invention relates to flour mills, and more particularly to the beater blades of centrifugal dressers or bolting reels, and has for its object to provide a blade which will effectively break up and disintegrate the stock as it is fed to the bolting reels from the break and reducing rolls, and which additionally will bolt and deliver as a finished product the flour from the reduced stock.

In order that the invention may be clearly understood by those skilled in the art, I have shown in the accompanying drawings one embodiment of my invention, and in said drawings—Figure 1 is a view of so much of a mill and bolting reel as is essential to an understanding of my invention, parts of the structure being shown in section to illustrate my invention. Fig. 2 is a detail edge view of a beater blade constructed in accordance with my invention, this blade being designed particularly for use on the stock as it comes from the break rolls. Fig. 3 is a detail side view of the blade shown in Fig. 2. Fig. 4 is a detail edge view of a beater blade formed of independent sections and having teeth which differ slightly from the forms shown in Figs. 2 and 3. Fig. 5 is a detail side view of the blade shown in Fig. 4.

Referring to the drawings by numbers, like numbers indicating like parts in the several views, 13 denotes a bolting reel which may be of the ordinary type.

Mounted in suitable bearing within the bolting reel 13 is a shaft 14 carrying a beater frame 15, which comprises the radial arms and the longitudinally disposed beater blades 16 carried by said radial arms, suitable gearing or drive mechanism being provided for imparting a rotatory motion to the beater or centrifugal dresser.

The stock to be dressed is fed in at one end of the reel by any suitable or usual means, and is subjected on entrance to the reel to the beating or agitating action of the revolving dresser.

It is essential to a rapid and efficient separation of the flour, and its delivery as a finished product through the bolting cloth of the reel, that the stock be entirely broken up at its initial entrance into the reel, in order that the maximum amount of flour may be driven through the bolting fabric, and delivered to the conveyers which carry the finished product from the mill.

In order that a sufficient and proper agitation of the flour may be secured I have provided the beater blade, which forms the subject of this case, and in which there is provided a stock opening or agitating section and a bolting section, so that preliminarily the stock is subjected to an opening or agitating action which will so break it up as that it will be delivered to the bolting section of the dresser in the very best condition for securing a maximum production of flour.

The beater blade which I have invented, and which is designated by 16 is preferably made of metal of the desired width and thickness to withstand the stress placed upon it, the said blade 16 at one end, namely, that end adjacent the receiving or inlet mouth of the bolting reel, being formed with a series of long narrow fingers 17 which are in alinement with one another, and separated by slots 18 and slightly angled.

The beater blade as thus constructed has a purely agitating and breaking up action on the stock, the slotted formation of this section of the blade tending to thoroughly agitate and comminute the stock so that there will be no massed or flaked fragments which will pass to the bolting section.

The agitating or breaking up section of the dresser is relatively short compared to the entire length of the reel, and the remainder of the blade 16 is formed in such manner as to throw the thoroughly agitated stock against the bolting cloth and bolt out the flour, at the same time feeding forward the stock toward the tailing end of the reel.

To accomplish this bolting and feeding process I slot the blade 16 to a less depth than the slotted agitating section just described to provide relatively short and wide blades and incline the blades 19 at an angle which will be effective for proper feeding. The relatively short, angled blades 19 will have the effect of throwing the stock centrifugally against the bolting cloth, through which the flour will be delivered in finished condition, and at the same time the stock will be gradually worked forward to the tailing end of the reel.

In Figs. 4 and 5 I have shown a beater blade which may be very successfully used in a contrifugal dresser, which receives stock from the reduction rolls, and it will be observed that this blade differs from the blade heretofore described, in that it is formed of independent sections or blades 20 and 21, and that while the agitating section 21 is provided with teeth of the same form as the corresponding portion of the blade shown in the other figures, and heretofore described, the bolting section 20 differs slightly in that it is made up of a series of slightly offset blades 22 which instead of being separated by pronounced slots are merely slitted one from the other, and slightly turned so that their action is very effective on stock which is cleaned, and which has passed through the first and second reduction rolls, and a rapid bolting of the stock is secured.

The independent blades 20 and 21 may be arranged either in alinement with one another, or they may be angularly offset from one another as shown in Fig. 4, so that the action of the one will be slightly in advance of the other.

It has been found that by the use of beater blades constructed in accordance with my invention a higher percentage of flour may be extracted from the stock by reason of the initial and thorough breaking up of the stock under the action of the agitating section of the blade, so that when delivered to the bolting section the stock is in such condition that the flour may be more completely separated from the stock and danger of loss, or the necessity of repeated bolting is eliminated.

It is, of course, obvious that various changes and variations may be made which would be within the purview of this disclosure without departing from the principle of my invention.

I claim:—

1. Beater instrumentalities for bolting reels, comprising a blade section having long narrow fingers to agitate the stock; and a dressing blade section having short fingers of greater width than the fingers of the agitating section to dress out the flour.

2. Beater instrumentalities for bolting reels, comprising an agitating blade section having long narrow fingers angularly disposed with respect to the blade body, to agitate and feed the stock forward; and a dressing blade section having short fingers of greater width than the fingers of said agitating section angularly disposed with respect to the blade body, to dress out the flour and feed the stock through the reel.

3. Beater instrumentalities for bolting reels, comprising an agitating blade-section having long narrow fingers spaced from one another and disposed at a slight angle to the blade body, to agitate and feed the stock forward slowly; and a dressing blade section having short wide fingers spaced from one another and disposed at a greater angle to the blade body than the agitating fingers, to dress out the flour and feed the stock through the reel at a relatively faster feed than the agitating fingers.

4. A beater blade for bolting reels having its working edge at the inlet end of the reel formed into long narrow fingers to thoroughly agitate the stock as it enters the reel, the other portion of said working edge having formed therein a series of short wide fingers to dress out the flour.

5. A beater blade for bolting reels having its working edge at the inlet end of the reel formed into long narrow angularly disposed fingers to thoroughly agitate and feed the stock as it enters the reel, the other portion of said working edge having formed therein a series of short, wide, angularly disposed fingers to dress out the flour and feed the stock through the reel.

6. A beater blade for bolting reels formed of a thin metal plate having at one end a series of long, narrow fingers spaced from one another and being slightly angled relative to the body of the blade to agitate the stock as it enters the reels, the rest of the blade being provided with short, wide fingers spaced from one another and set at a greater angle relative to the body of the blade than the agitating fingers to dress out the flour and feed the material through the reel.

In testimony whereof I have hereunto set my hand in presence of two subscribing witnesses.

LUCIUS FREEMAN LITTLE.

Witnesses:
GERTRUDE M. STUCKER,
C. H. FESLER.